United States Patent [19]
Takahashi et al.

[11] Patent Number: 5,121,716
[45] Date of Patent: Jun. 16, 1992

[54] FUEL INJECTION TYPE INTERNAL COMBUSTION ENGINE

[75] Inventors: Hitoshi Takahashi; Kaoru Horie; Kazutoshi Nishizawa; Eisuke Kimura, all of Saitama, Japan

[73] Assignee: Honda Giken Kogyo Kabushiki Kaisha, Tokyo, Japan

[21] Appl. No.: 715,812

[22] Filed: Jun. 17, 1991

[30] Foreign Application Priority Data

Jun. 15, 1990 [JP] Japan ................................ 2-157127

[51] Int. Cl.⁵ ............................................. F02M 23/04
[52] U.S. Cl. ................................... 123/531; 123/432
[58] Field of Search .............. 123/531, 432, 308, 585, 123/587

[56] References Cited

U.S. PATENT DOCUMENTS 4,714,063  12/1987  Oda et al. ........................... 123/432

FOREIGN PATENT DOCUMENTS 58-192957  11/1983  Japan ................................ 123/308
58-192958  11/1983  Japan ................................ 123/432
58-197464  11/1983  Japan ................................ 123/585

*Primary Examiner*—Andrew M. Dolinar
*Attorney, Agent, or Firm*—Lyon & Lyon

[57] ABSTRACT

A fuel injection type internal combustion engine has a pair of intake ports provided in a cylinder head to connect a pair of intake valve bores facing a combustion chamber with a single intake inlet end. A fuel injection valve is disposed in an orientation frm the intake inlet end toward both the intake valve bores and includes an assist-air supply means for finely atomizing the fuel. A valve operating mechanism is provided for selectively stopping the intake through one of the intake ports in accordance with the operational condition of the engine. A control means is connected to the assist-air supply means for controlling the assist-air supply means to stop the supply of assist air from the assist-air supply means in at least a portion of an operational region in which the intake through one of the intake ports is substantially stopped. This ensures that the impediment of the production of the swirl by the assist air can be avoided by stopping the supply of assist air in a condition in which the intake through one of the intake ports is substantially stopped to produce a swirl in the combustion chamber.

5 Claims, 8 Drawing Sheets

FUEL INJECTION TYPE INTERNAL COMBUSTION ENGINE

BACKGROUND OF THE INVENTION

1. Field of the Invention

The field of the present invention is fuel injection type internal combustion engines comprising a pair of intake ports provided in a cylinder head to connect a pair of intake valve bores facing a combustion chamber with a single intake inlet end, and a fuel injection valve disposed in an orientation from the intake inlet end to both the intake valve bores and including an assist-air supply means for finely atomizing a fuel, so that the intake through one of the intake ports can be substantially stopped in accordance with the operative condition of the engine.

2. Description of the Prior Art

Such a fuel injection type internal combustion engine is already known, for example, from Japanese Patent Application Laid-Open No. 142053/85.

In the above prior art, when the engine is in a low-load operation, the intake through one of the intake ports is stopped to produce a swirl in the combustion chamber, while a fuel jet flow from the fuel injection valve is diverted toward the other intake port by air-assist from an air-assist means added to the fuel injection valve, thereby minimizing adhesion of the fuel onto an inner surface of the intake port. However, if the fuel is finely atomized by the assist air during a low-load operation with a relatively small intake amount, the production of the swirl in the combustion chamber is impeded, bringing about a deteriorated combustibility.

SUMMARY OF THE INVENTION

Accordingly, it is an object of the present invention to provide a fuel injection type internal combustion engine wherein the air-assisting is controlled in accordance with the operational condition of the engine to prevent the combustibility from being deteriorated.

To achieve the above object, according to the present invention, there is provided a fuel injection type internal combustion engine comprising a pair of intake ports provided in a cylinder head to connect a pair of intake valve bores facing a combustion chamber with a single intake inlet end, and a fuel injection valve disposed in an orientation from the intake inlet end to both the intake valve bores and including an assist-air supply means for finely atomizing a fuel, so that the intake through one of the intake ports can be substantially stopped in accordance with the operational condition of the engine, wherein the engine further includes a control means connected to the assist-air supply means for controlling the assist-air supply means to stop the supply of an assist air from the assist-air supply means in at least a portion of an operational region in which the intake through one of the intake ports is substantially stopped.

This ensures that the impediment of the production of the swirl by the assist air can be avoided by stopping the supplying of the assist air in a condition in which the intake through one of the intake ports is substantially stopped to produce a swirl in the combustion chamber.

In another aspect of the present invention, a valve operating system is connected to a pair of intake valves capable of individually opening and closing the pair of intake valve bores and is arranged to permit one of the intake valves to be brought into a substantially inoperative state. This enables an air-assisting effect to be utilized more effectively.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 1 to 8 illustrate one embodiment of the present invention, wherein

FIG. 1 is an elevation view of the construction of the air intake system of a fuel injection type internal combustion engine;

FIG. 2 is an enlarged sectional view illustrating a valve operating system;

FIG. 3 is a top plan view taken along a line III—III in FIG. 2;

FIG. 4 is an enlarged sectional view taken along a line IV—IV in FIG. 3;

FIG. 5 is an enlarged view of a portion indicated by V in FIG. 1;

FIG. 6 is a flow chart illustrating a processing procedure for prohibiting the supply of an assist air;

FIG. 7 is a diagram illustrating an assist-air supply prohibiting area and a swirl producing area;

FIG. 8 is a flow chart illustrating a processing procedure for producing a swirl.

DESCRIPTION OF THE PREFERRED EMBODIMENTS

The present invention will now be described by way of a preferred embodiment in connection with the accompanying drawings.

Figure 1:
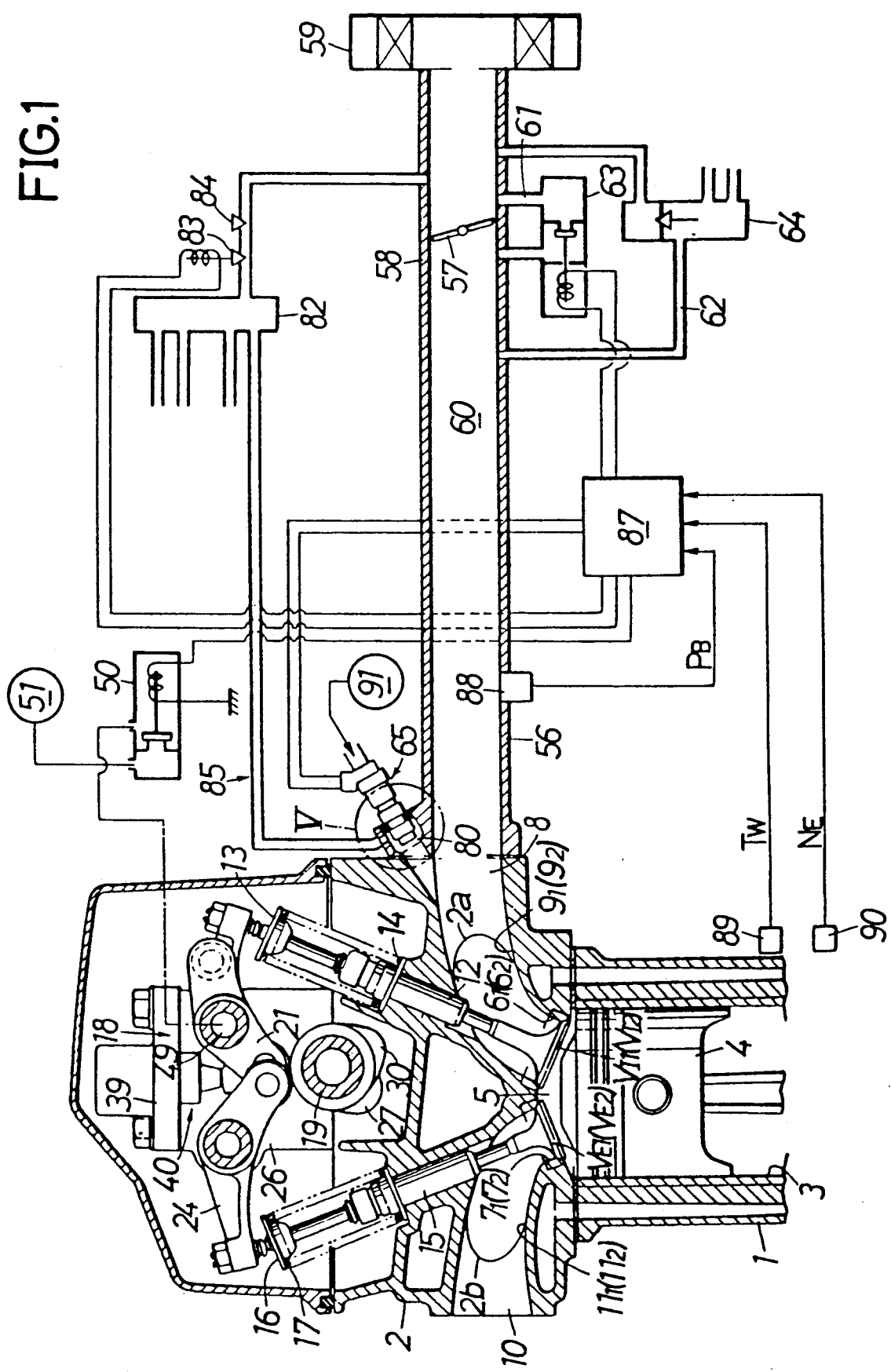
Figure 2:
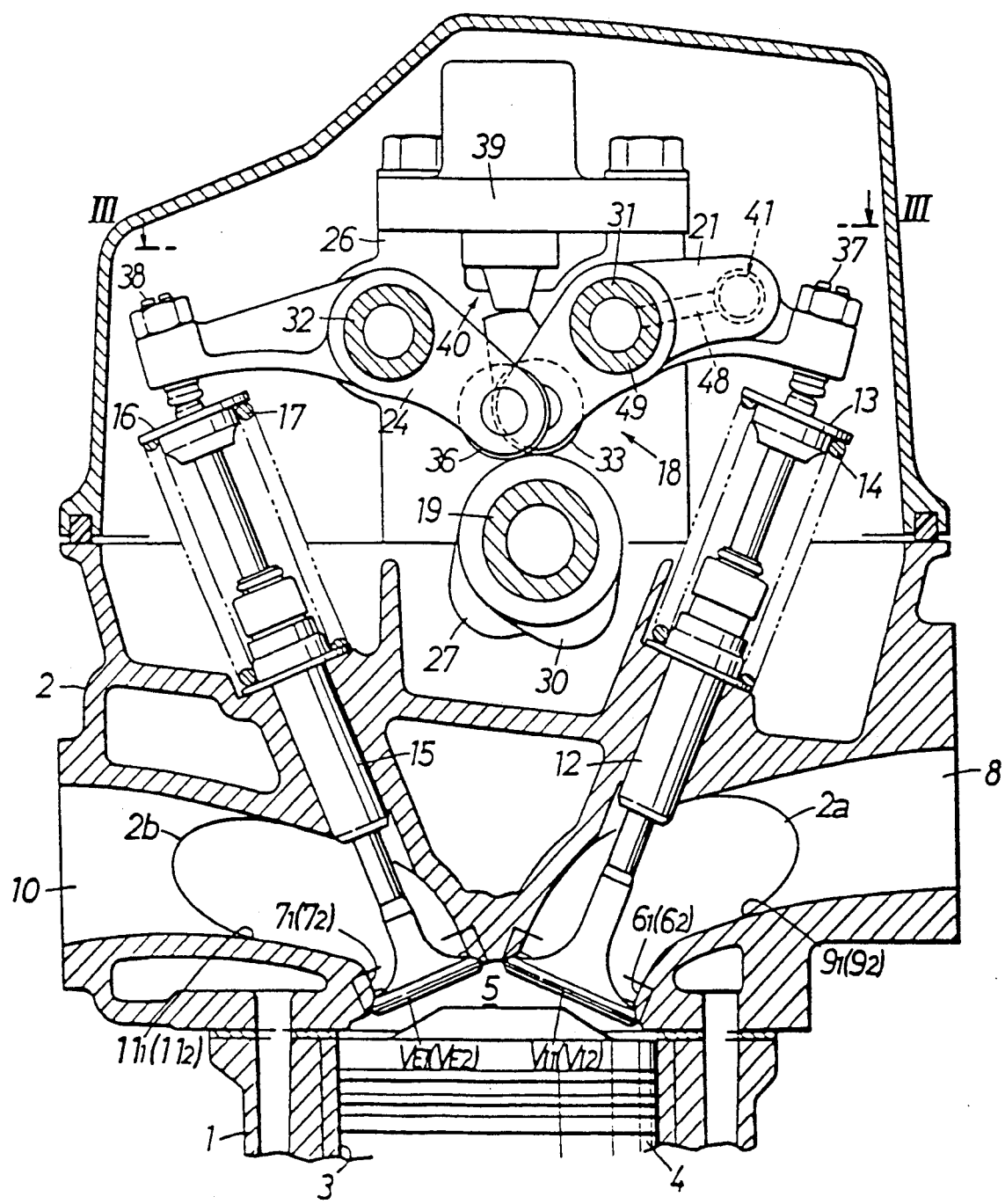

Referring first to FIGS. 1 and 2, a cylinder head 2 is coupled to an upper surface of a cylinder block 1 to constitute an essential portion of an engine body in an SOHC type multi-cylinder internal combustion engine. A piston 4 is slidably received in each of a plurality of cylinders 3 provided in the cylinder block 1, and a combustion chamber 5 is defined between a top surface of the piston 4 and the cylinder head 2.

A pair of intake valve bores $6_1$ and $6_2$ and a pair of exhaust valve bores $7_1$ and $7_2$ are provided in the cylinder head 2 and open into a ceiling surface of the combustion chamber 5. The intake valve bores $6_1$ and $6_2$ are connected to a single intake inlet end 8 opened into one side of the cylinder head 2 through intake ports $9_1$ and $9_2$ between which a partition wall $2a$ is interposed. The exhaust valve bores $7_1$ and $7_2$ are connected to a single exhaust outlet end 10 opened into the other side of the cylinder head 2 through exhaust ports $11_1$ and $11_2$ between which a partition wall $2b$ is interposed. A pair of intake valves $V_{I1}$ and $V_{I2}$ are slidably fitted in a pair of cylindrical guides 12 disposed in the cylinder head 2 for opening and closing the intake valve bores $6_1$ and $6_2$, respectively, and a retainer 13 is fixed to an upper end of each of the intake valves $V_{I1}$ and $V_{I2}$ protruding from corresponding one of the cylindrical guides 12. A coiled valve spring 14 is interposed between each of the retainers 13 and the cylinder head 2 to surround each of the intake valves $V_{I1}$ and $V_2$, so that the intake valves $V_{I1}$ and $V_{I2}$ are biased upwardly, i.e. in a closing direction by the valve springs 14. Additionally, a pair of exhaust valves $V_{E1}$ and $V_{E2}$ are slidably fitted in a pair of cylindrical guides 15 disposed in the cylinder head 2 for opening and closing the exhaust valve bores $7_1$ and $7_2$, respectively, and a retainer 16 is fixed to an upper end of each of the exhaust valves $V_{E1}$ and $V_{E2}$ protruding from corresponding one of the cylindrical guides 15. A coiled valve spring 17 is interposed between the retainer 16 and the cylinder head 2 to surround each of the exhaust valves $V_{E1}$ and $V_{E2}$, so that the exhaust valves $V_{E1}$ and $V_{E2}$ are biased upwardly, i.e., in a closing direction by the valve springs 17.

Figure 3:
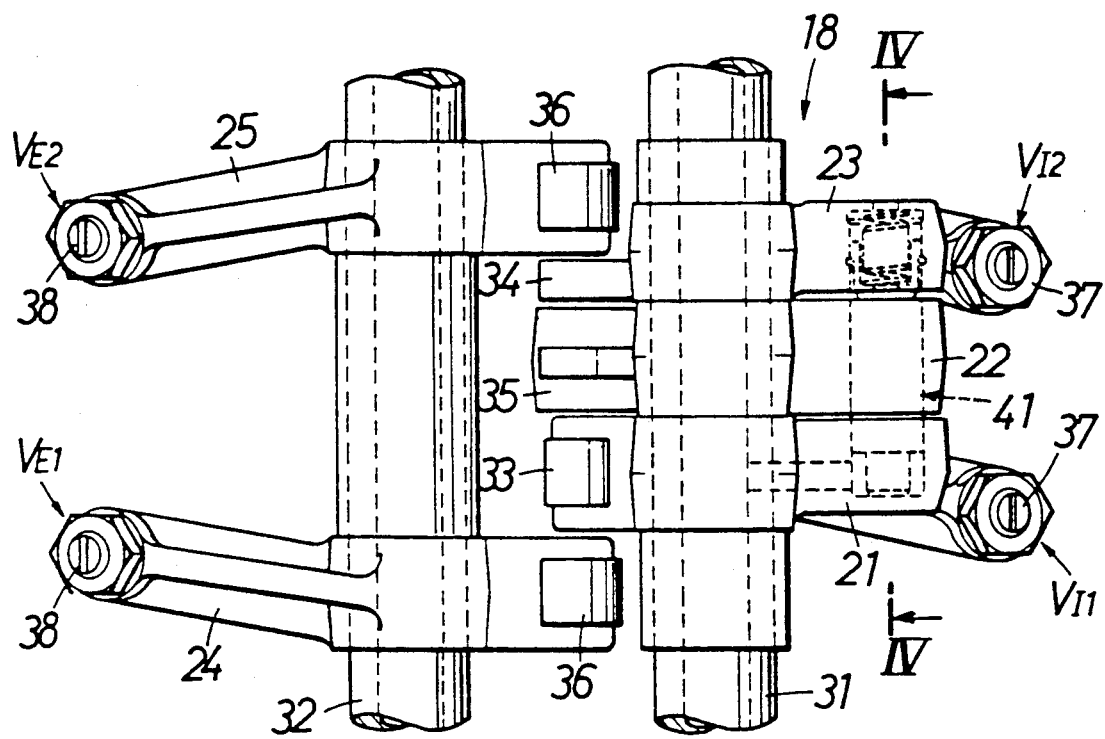

Referring also to FIG. 3, a valve operating system 18 is connected to the intake valves $V_{I1}$ and $V_{I2}$ the exhaust valves $V_{E1}$, and $V_{E2}$. The valve operating system 18 comprises a single camshaft 19 operatively connected to a crankshaft (not shown) with a reduction ratio of ½, a first 21, a second 22 and a third intake rocker arm 23 for converting the rotating movement of the camshaft 19 into opening and closing motions of the intake valves $V_{I1}$ and $V_{I2}$, and a first 24 and a second exhaust rocker arm 25 for converting the rotating movement of the camshaft 19 into opening and closing motions of the exhaust valves $V_{E1}$ and $V_{E2}$.

The camshaft 19 is rotatably supported by the cylinder head 2 and a plurality of holders 26 which are coupled to the cylinder head 2 on opposite sides of each cylinder 3 along an axis of the crankshaft and has a horizontal axis perpendicular to the axis of each cylinder 3.

Figure 4:
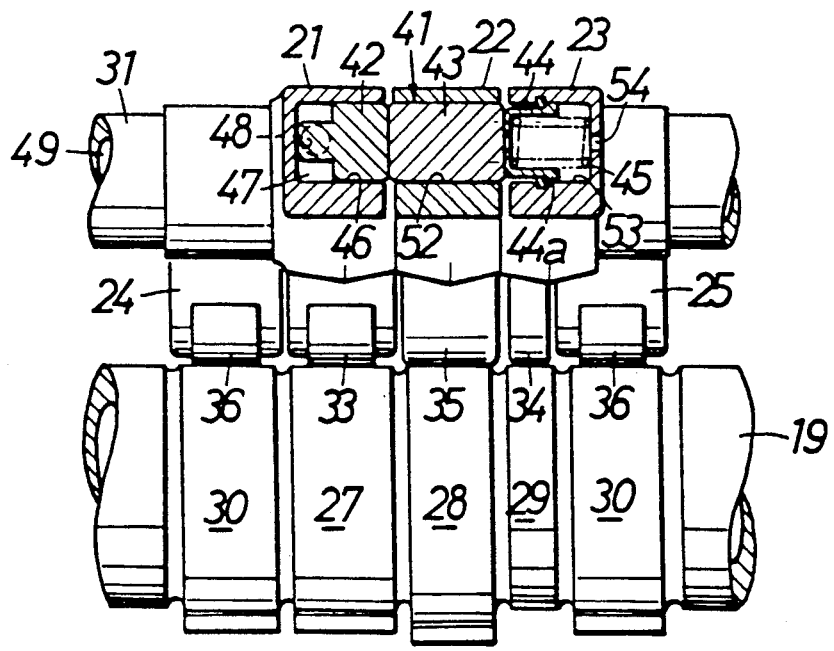

Referring to FIG. 4, integrally provided on the camshaft 19 are a first intake cam 27 formed into a shape corresponding to a low speed operation of the engine, a second intake cam 28 formed into a shape corresponding to a high speed operation of the engine and disposed adjacent one side of the first intake cam 27, a raised portion 29 located adjacent the other side of the second intake cam 28, and exhaust cams 30, 30 on opposite sides of the first intake cam 27 and the raised portion 29. The raised portion 29 is basically formed to have an outer surface circular about the axis of the camshaft 19 in order to ensure that one intake valve $V_{I2}$ of the intake valves $V_{I1}$ and $V_{I2}$ is brought into a substantially inoperative state in a low speed operation region of the engine, but is provided with a slightly protruding projection in a section corresponding to rising portions of the first and second intake cams 27 and 28. Moreover, the width of the raised portion 29 in a direction along the axis of the camshaft 19 is relatively small level.

The first intake rocker arm 21 is operatively connected to the one intake valve $V_{I1}$, and the third intake rocker arm 23 is operatively connected to the other intake valve $V_{I2}$. The second intake rocker arm 22 is disposed between the first and third intake rocker arms 21 and 23, so that it can be separately moved relative to the intake valves $V_{I1}$ and $V_{I2}$. The intake rocker arms 21 and 23 are swingably carried on an intake rocker shaft 31 which is fixedly supported in the holders 26 above and laterally of the camshaft 19 and has an axis parallel to the camshaft 19. The first and second exhaust rocker arms 24 and 25 are operatively connected individually to the exhaust valves $V_{E1}$ and $V_{E2}$ and swingably carried on an exhaust rocker shaft 32 which is fixedly supported in the holders 26 in parallel to the intake rocker shaft 31 above and laterally of the camshaft 19.

A roller 33 is rotatably mounted by a pin (not shown) at one end of the first intake rocker arm 21 to come into slide contact with the first intake cam 27. A slide contact portion 34 having a reduced width is provided at one end of the third intake rocker arm 23 in correspondence to the raised portion 29 to come into sliding contact with the raised portion 29. A cam slipper 35 is mounted on the second intake rocker arm 22 to come into sliding contact with the second intake cam 28. Also, rollers 36 are rotatably mounted by pins (not shown) at one end of each of the exhaust rocker arms 24 and 25 to come into sliding contact with the exhaust cams 30, 30 provided on the camshaft 19, respectively.

Tappet screws 37 are threadedly mounted in the other ends of the first and third intake rocker arms 21 and 23 to abut against the upper ends of the intake valves $V_{I1}$ and $V_{I2}$, respectively, so that the intake valves $V_{I1}$ and $V_{I2}$ are opened and closed in accordance with the swinging movements of the first and third intake rocker arms 21 and 23. Tappet screws 38 are threadedly mounted in the other ends of the exhaust rocker arms 24 and 25 to abut against the upper ends of the exhaust valves $V_{E1}$ and $V_{E2}$, respectively, so that the exhaust valves $V_{E1}$ and $V_{E2}$ are opened and closed in accordance with the swinging movements of the exhaust rocker arms 24 and 25.

A support plate 39 is placed to extend between upper ends of the holders 26. A lost motion mechanism 40 is disposed on the support plate 39 for resiliently urging in the second intake rocker arm 22 in a direction of sliding contact with the second intake cam 28 of the camshaft 19.

A connection switchover mechanism 41 is provided in the intake rocker arms 21 to 23 for switching-over the connection and disconnection of the intake rocker arms 21, 22 and 23 in accordance with the operational condition of the engine.

The connection switchover mechanism 41 comprises a connecting piston 42 capable of connecting the first and second intake rocker arms 21 and 22, a connecting pin 43 capable of connecting the second and third intake rocker arms 22 and 23, a restraining member 44 for restraining the movement of the connecting piston 42 and the connecting pin 43, and a return spring 45 for biasing the connecting piston 42, the connecting pin 43 and the restraining member 44 to their disconnecting positions.

A first bottomed guide hole 46 is provided in the first intake rocker arm 21 in parallel to the intake rocker shaft 31 and opened toward the second intake rocker arm 22. The connecting piston 42 is slidably received into the first guide hole 46, and a hydraulic pressure chamber 47 is defined between one end of the connecting piston 42 and a closed end of the first guide hole 46. A communication passage 48 is provided in the first intake rocker arm 21 to communicate with the hydraulic pressure chamber 47, and an oil passage 49 is provided within the intake rocker shaft 31 and always communicates with the communication passage 48 and thus the hydraulic pressure chamber 47 despite the swinging of the first intake rocker arm 21. The oil passage 49 is connected to a hydraulic pressure source 51 through a connectionswitchover electromagnetic control valve 50, as shown in FIG. 1.

A guide hole 52 is provided in the second intake rocker arm 22 in correspondence to the first guide hole 46 and in parallel to the intake rocker shaft 31 to extend between opposite sides of the second intake rocker arm 22. The connecting pin 43, having one end abutting against the other end of the connecting piston 42, is slidably received in the guide hole 52.

A second bottomed guide hole 53 is provided in the third intake rocker arm 23 in correspondence to the guide hole 52 and in parallel to the intake rocker shaft 31 and is open toward the second intake rocker arm 22. The cylindrical bottomed restraining member 44, abutting against the other end of the connecting pin 43, is slidably received in the second guide hole 53. The restraining member 44 is disposed with its opened end directed to a closed end of the second guide hole 53 and has a collar 44a projecting radially outwardly at the opened end into sliding contact with an inner surface of the second guide hole 53. The return spring 45 is mounted in a compressed manner between the closed end of the second guide hole 53 and the closed end of the restraining member 44, so that the connecting piston 42, the connecting pin 43 and the restraining member 44 abutting against one another are biased toward the hydraulic pressure chamber by the spring force of the return spring 45. Moreover, a communication hole 54 is provided in the closed end of the second guide hole 53 for venting air and oil.

In such connection switchover mechanism 41, when the engine is in a low speed operation, the hydraulic pressure in the hydraulic pressure chamber 47 is released by the connection-switchover electromagnetic control valve 50. Under the influence of the spring force of the return spring 45, the abutment surfaces of the connecting piston 42 and the connecting pin 43 are in a position corresponding to between the first intake rocker arm 21 and the second rocker arm 22, and the abutment surfaces of the connecting pin 43 and the restraining member 44 are in a position corresponding to between the second intake rocker arm 22 and the third intake rocker arm 23. Thus, the rocker arms 21, 22 and 23 are in states in which they are angularly displaceable relative to one another. The first intake rocker arm 21 is swung in response to the sliding contact with the first intake cam 27 by rotation of the camshaft 19, so that the one intake valve $V_{I1}$ is opened and closed with a timing and a lift amount depending upon the shape of the first intake cam 27. The intake rocker arm 23 in sliding contact with the raised portion 29 is brought into a substantially inoperative state, so that the other intake valve $V_{I2}$ can be brought into a substantially inoperative state. However, the intake valve $V_{I2}$ is not completely inoperative and can be slightly operated in an opening direction, when the one intake valve $V_{I1}$ is opened. This makes it possible to prevent the intake valve $V_{I2}$ from becoming stuck on the valve seat and the retention of fuel in intake valve bore $6_2$, which may occur when the intake valve $V_{I2}$ is kept completely closed. Further, the second intake rocker arm 22 is swung in response to the sliding contact with the second intake cam 28, but such swinging movement exerts no influence on the first and third intake rocker arms 21 and 23. In addition, the exhaust valves $V_{E1}$ and $V_{E2}$ are opened and closed with a timing and a lift amount depending upon the shape of the exhaust cams 30, 30.

During high speed operation of the engine, the connection-switchover electromagnetic control valve 50 is opened, so that a higher hydraulic pressure is applied to the hydraulic pressure chamber 47. This causes the connecting piston 42 to be moved in a direction to increase the volume of the hydraulic pressure chamber 47 against the spring force of the return spring 45, while urging the connecting pin 43. When the axes of the guide holes 46, 52 and 53 are aligned with one another, i.e., when the rocker arms 21, 22 and 23 enter their stationary states, the connecting piston 42 is received into the guide hole 52 and in response to this, the connecting pin 43 is received into the guide hole 53, thereby providing the connection of the rocker arms 21, 22 and 23 to one another. The first and third intake rocker arms 21 and 23 are swung together with the second intake rocker arm 22 which is in sliding contact with the second intake cam 28, thereby causing the intake valves $V_{I1}$ and $V_{I2}$ to be opened and closed with a timing and a lift amount depending upon the shape of the second intake cam 28. In addition, the exhaust rocker arms 24 and 25 are opened and closed with a timing and a lift amount depending upon the shape of the exhaust cams 30, 30, as during the low speed operation.

Referring again to FIG. 1, an air cleaner 59 is connected to the intake inlet end 8 through an intake manifold 56 and a throttle body 58 including a throttle valve 57. An intake passage 60 is provided in the intake manifold 56 and the throttle body 58 to extend from the air cleaner 59 to the intake inlet end 8. A bypass passage 61 and a first idle passage 62 are connected in parallel to the intake passage 60 around the throttle valve 57. A bypass electromagnetic control valve 63 is provided in the bypass passage 61, and a wax operated valve 64 is provided in the first idle passage 62 and operated in accordance with the temperature of cooling water for the engine body.

Figure 5:
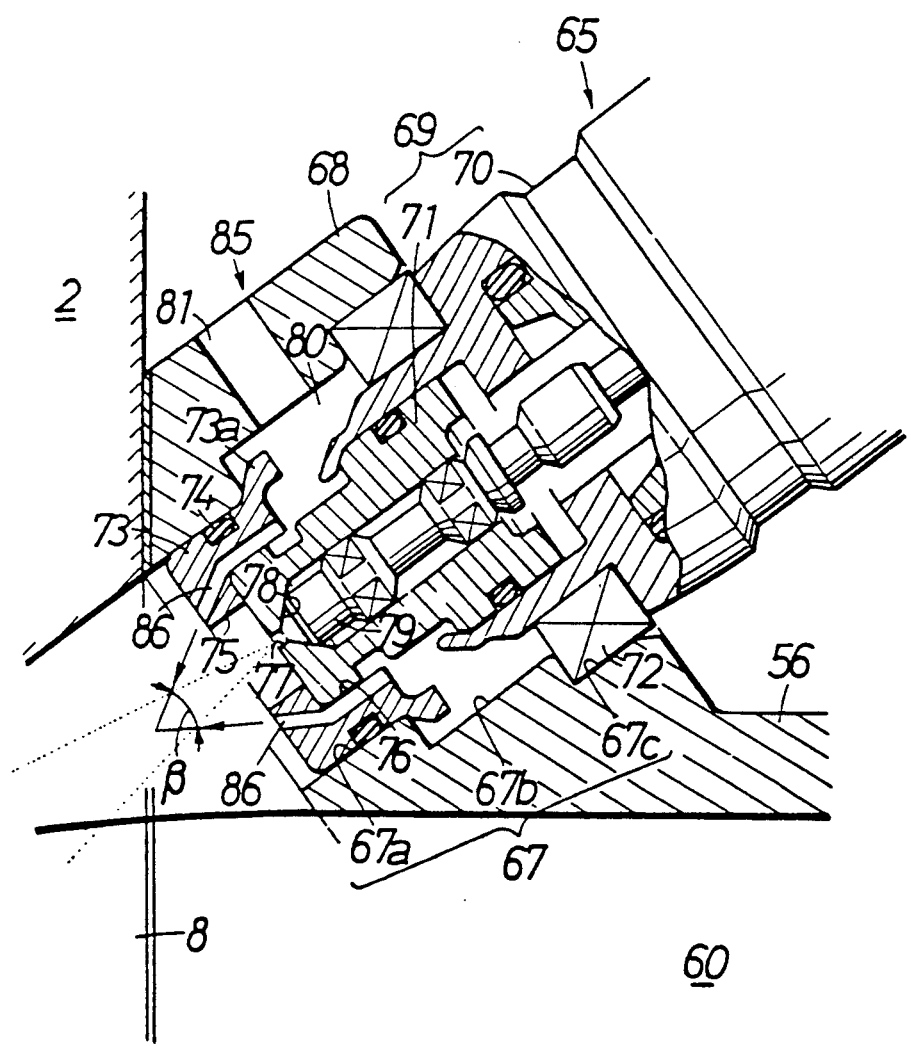

Referring also to FIG. 5, a fuel injection valve 65 is mounted to the end of the intake manifold 56 closer to the cylinder head 2 and is directed from the intake inlet end 8 toward the intake valve bores $6_1$ and $6_2$. More specifically, a mounting portion 68 is provided at the end of the intake manifold 56 closer to the cylinder head 2 and includes a mounting hole 67 having an axis extending obliquely from above toward the intake inlet end 8, and the fuel injection valve 65 is mounted in the mounting portion 68 with its leading end protruding into the mounting hole 67.

The mounting hole 67 is comprised of a small diameter hole portion 67a, a medium diameter hole portion 67b and a large diameter hole portion 67c, which are coaxially arranged in sequence from the inner side. The fuel injection valve 65 has a housing 69 which is comprised of a basically cylindrical valve housing 71 secured at its rear end to a drive housing 70 containing an electromagnetic drive (not shown) therein. The housing 69 is mounted to the mounting portion 68 with the valve housing 70 protruding into the mounting hole 67 and with a sealing member 72 interposed between the drive housing 70 and the large diameter hole portion 67c in the mounting hole 67.

A receiving member 73 is fitted in the smaller diameter hole portion 67a of the mounting hole 67 through a sealing member 74 and is formed basically into a disk having, at its rear end, an engagement collar 73a engaging a step between the smaller diameter hole portion 67a and the medium diameter hole portion 67b. The receiving member 73 is provided at its central portion with a front through-hole 75 and a fitting hole 76 larger in diameter than the through-hole 75, these holes 75 and 76 being coaxially connected to each other. A leading end of the valve housing 71 in the fuel injection valve 65 is fitted in teh fitting hole 76 for reception by a step between the through hole 75 and the fitting hole 76.

Coaxially provided centrally in the leading end of the valve housing 71 are a fuel injection port 77 and a tapered valve seat 78 connected to the fuel injection port 77. A valve member 79 capable of being seated on the valve seat 78 is axially movably contained within the valve housing 71. The valve member 79 is adapted to be driven axially by the electromagnetic drive contained in the drive housing 70 between a position in which it is seated on the valve seat 78 to close the fuel injection port 77 and a position in which it is spaced apart from the valve seat 78 to open the fuel injection port 77. When the valve member 79 is moved away from the valve seat 78, fuel from a fuel supply source 91 is injected forwardly, i.e., toward the intake inlet end 8 through the fuel injection port 77.

With the fuel injection valve 65 mounted to the mounting portion 68, an annular air chamber 80 is defined between an inner surface of the mounting portion 68 and the housing 69, and a passage 81 is provided in the mounting portion 68 to lead to the air chamber 80. The passage 81 is connected to an air header 82 common to individual cylinders. The air header 82 is connected to the intake passage 60 upstream of the throttle valve 57 bioi an electromagnetic air control valve 83 and an idle adjusting screw 84.

A pair of air-assist injection ports 86, 86 are provided in the receiving member 73 from the air chamber 80 and are positioned on opposite sides of the fuel injection port 77 in the fuel injection valve 65.

The pair of air-assist injection ports 86, 86, the air chamber 80, the air header 82, the electromagnetic air control valve 83 and the idle adjusting screw 84 constitute an assist-air supply means 85. The amount of assist air supplied from the assist-air supply means 85 may be varied by operation of the electromagnetic air control valve 83.

Referring again to FIG. 1, the operations of the connection switchover electromagnetic control valve 50, the bypass electromagnetic control valve 63, the fuel injection valve 65 and the electromagnetic air control valve 83 in the assist-air supply means 85 are controlled by a control means 87 comprising a computer. An intake pressure $P_B$ detected in an intake pressure sensor 88, a cooling-water temperature detected in an engine cooling-water temperature sensor 89 and an engine revolution number $N_E$ detected in a revolution number sensor 90 are supplied to the control means 87.

When the engine is in a low-load operation region, the control means 87 controls the operation of the connection switchover mechanism 41 of the valve operating system 18 in the low-load operation region to substantially stop the intake from one of the intake ports $9_2$ by causing one of the intake valves $V_{f2}$ to be in a substantially inoperative state, and controls the operation of the electromagnetic air control valve 83 to stop the supply of the assist air from the assist-air supply means 85 in at least a portion of such a low-load operation region.

Figure 6:
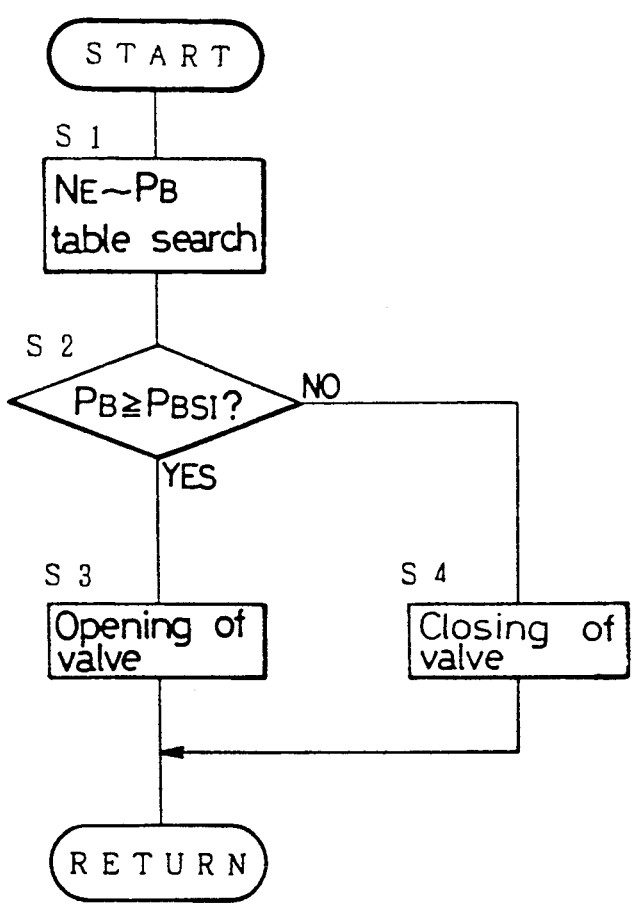
Figure 7:
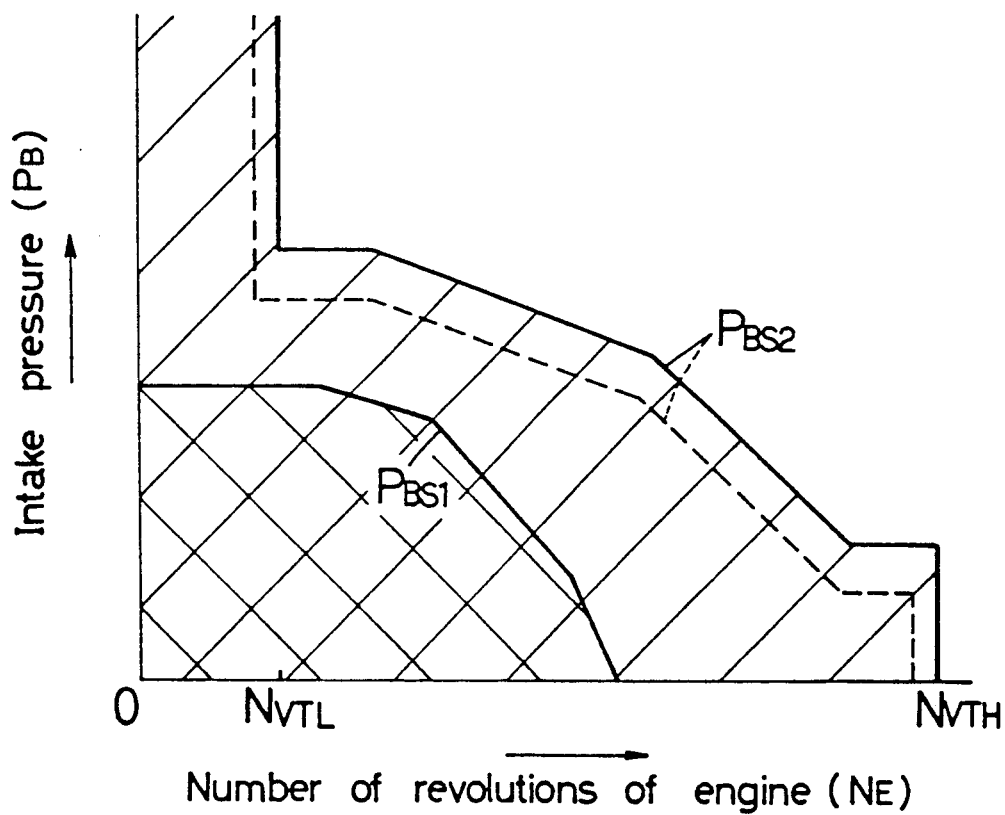

The processing procedure for controlling the operation of the electromagnetic air control valve 83 will now be described in connection with FIG. 6. At a first step S1, a search is carried out according to an $N_E/P_B$ table previously established as shown in FIG. 7. If it is decided at a second step S2 that the intake pressure $P_B$ is equal to or more than a first preset intake pressure ($P_B \geq P_{BS1}$) on the basis of the step S1 search, the electromagnetic air control valve 83 is opened at a third step S3 to supply the assist air from the assist-air supply means 85. IF it is decided that the intake pressure $P_B$ is less than the first preset intake pressure ($P_B < P_{BS1}$), the electromagnetic air control valve 83 is closed at a fourth step S4 to stop the supply of the assist air from the assist-air supply means 85.

More specifically, the control means 87 controls the operation of the electromagnetic air control valve 83 to stop the supply of the assist air from the assist-air supply means 85 in a low load operation region where the intake pressure $P_B$ is less than the first preset intake pressure $P_{BS1}$.

Figure 8:
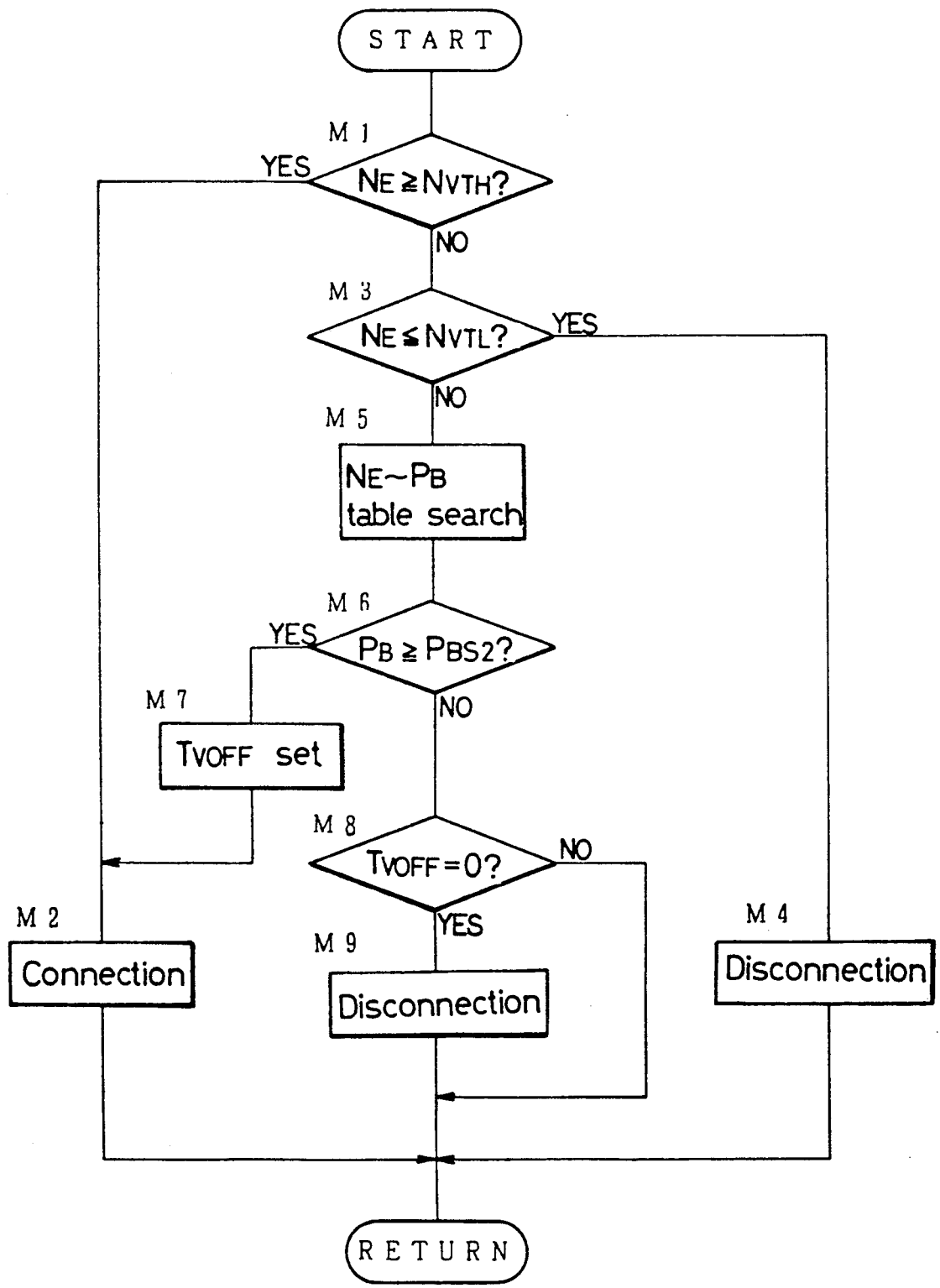

The control means 87 has a processing procedure previously established therein as shown in FIG. 8 for controlling the operation of the connection switchover mechanism 41 in the valve operating system 18, i.e., the operation of the connection switchover electromagnetic control valve 50. At a first step M1, it is decided whether or not the engine revolution number $N_E$ is equal to or more than a higher preset revolution number $N_{VTH}$ ($N_E \geq N_{VTN}$). If $N_E \geq N_{VTH}$, processing is advanced to a second step M2 at which the connection switchover electromagnetic control valve 50 is opened, and the connection switchover mechanism 41 is operated into a connecting state in which the intake valves $V_{f1}$ and $V_{f2}$ are opened and closed by the second intake cam 28.

If $N_E < N_{VTN}$ at the first step M1, it is decided at a third step M3 whether or not the engine revolution number $N_E$ is equal to or less than a lower preset revolution number $N_{VTL}$ ($N_E \leq N_{VTL}$). If $N_E \leq N_{VTL}$, the connection switchover electromagnetic control valve 50 is closed at a fourth step M4, the connection switchover mechanism 41 is operated for disconnection, thereby causing the one intake valve $V_{f1}$ to be opened and closed by the first intake cam 27, while causing the other intake valve $V_{f2}$ to be brought into the substantially inoperative state.

If $N_E > N_{VTL}$ at the third step M3, processing is advanced to a fifth step M5 at which a search is carried out according to the $N_E$–$P_B$ table previously established as shown in FIG. 7. In this table, a second preset intake pressure $P_{BS2}$ higher than the first preset intake pressure $P_{BS1}$ is set in an area where the engine revolution number $N_E$ is equal to or more than the lower preset revolution number $N_{VTL}$ and less than the higher preset revolution number $N_{VTH}$. If it is decided at a next sixth step M6 that the intake pressure $P_B$ is equal to or more than the second preset intake pressure $P_{BS2}$ ($P_B \geq P_{BS2}$) on the basis of this search, processing is advanced to a seventh step M7. If $P_B \leq R_{BS2}$, processing is advanced to an eighth step M8. Moreover, the second preset intake pressure $P_{BS2}$ is set to have a hysteresis, and a value indicated by a solid line in FIG. 7 is used in changing the connecting switchover mechanism 41 from the disconnecting state to the connecting sate, while a value indicated by a dashed line in FIG. 7 is used in changing the connecting switchover mechanism 41 from the connecting state to the disconnecting state.

At the seventh step M7, a timer $T_{VOFF}$ is set to start a count-down of a predetermined period of time, e.g., three seconds, proceeding to the second step M2. At the eighth step M8, it is decided whether or not the timer $T_{VOFF}$ set at the step M7 has become "0 (zero)", i.e., three seconds have been lapsed after the relation $P_B \geq P_{BS2}$ has been established in an area where the engine revolution number $N_E$ is equal to or more than the lower preset revolution number $N_{VTL}$ and less than the higher revolution number $N_{VTH}$. Only when it has been decided that the predetermined period of time has lapsed, processing is advanced to a ninth step M9 at which the connection switchover electromagnetic control valve 50 is controlled to bring the connection switchover mechanism 41 into the disconnecting state.

The summary of the processing procedure shown in FIG. 8 is as follows: In an operational region of intake pressures $P_B$ equal to or more than the second preset intake pressure $P_{BS2}$ in accordance with the engine revolution number $N_E$, the connection switchover mechanism 41 is brought into the connecting state, causing the intake valves $V_{I1}$ and $V_{I2}$ to be opened and closed by the second intake cam 28, and in the other operational region, the connection switchover mechanism 41 is brought into the disconnecting state, causing the one intake valve $V_{I1}$ to be opened and closed by the first intake cam 27, while causing the other intake valve $V_{I2}$ to be brought into the substantially inoperative state. Moreover, when the connection switchover mechanism 41 is changed from the connecting state to the disconnecting state in the area where the engine revolution number $N_E$ is equal to or more than the lower preset revolution number $N_{ITL}$ and less than the higher revolution number $N_{ITH}$, the operation of the connection switchover mechanism 41 to the disconnecting state is prohibited until a predetermined period of time has lapsed, e.g., three seconds have lapsed. This is for the purposes of allowing for the fact that a hunting of the control is apt to be produced when the switchover operation of the connecting switchover mechanism 41 is judged on the basis of the intake pressure $P_B$, because the intake pressure $P_B$ is likely to be varied.

The operation of this embodiment will be described below. An air flow is injected through the upper and lower assist-air injection ports 86, 86 toward a fuel jet flow injected through the fuel injection port 77 in the fuel injection valve 65, thereby causing fuel particles in the fuel jet flow to be finely atomized as a result of contact with the air flow. This provides an increased combustibility in the combustion chamber 5. However, in a lower load-side portion (shown by intersection of rightwardly and leftwardly ascending lines in FIG. 7) of an area (shown by drawing a rightwardly-ascending oblique lines in FIG. 7) in which one intake valve $V_{I2}$ is brought into the substantially inoperative state, so that the fuel-air mixture is supplied only through the intake valve bore $6_1$ to produce a swirl in the combustion chamber 5, the impediment of the formation of such a swirl by the assist air can be avoided by the prohibition of the air-assisting for the fuel jet flow from the fuel injection valve 65. This makes it possible to prevent the combustibility from being deteriorated.

Moreover, in substantially stopping the intake from one intake port $9_2$, one intake valve $V_{I2}$ is brought into a substantially inoperative closed state. Therefore, as compared with a system in which a shutter valve or the like is disposed in the one intake port $9_2$, the finely-atomized fuel cannot be adhered to the shutter valve, and an air-assisting effect can be utilized more effectively.

Figure 9:
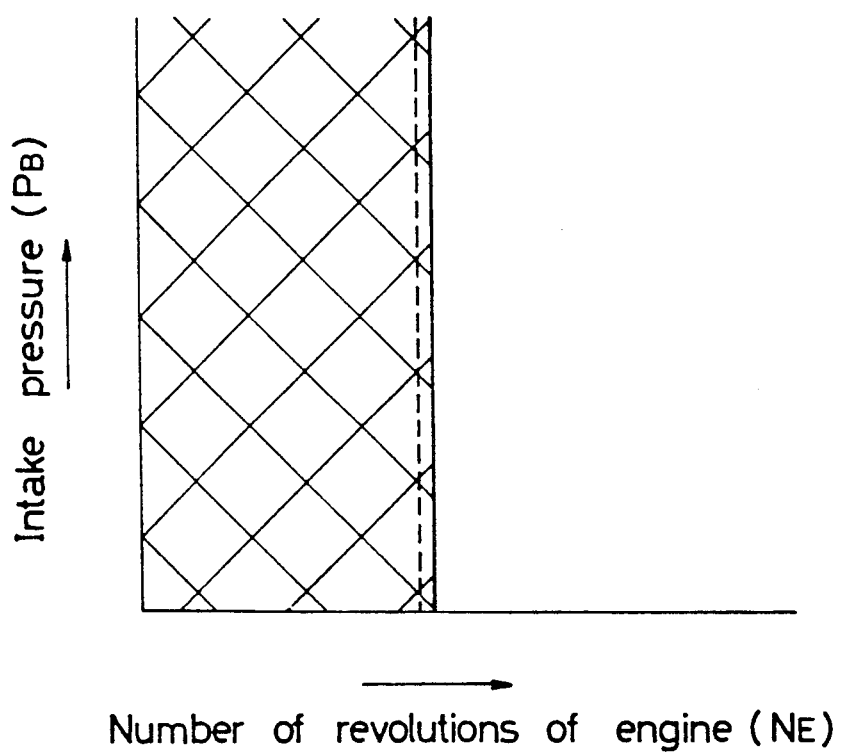
FIG. 9 is a diagram illustrating a modification of an assist-air supply stopping area and a swirl producing area.

FIG. 9 illustrates a modification of the area in which the air assisting is prohibited. Two areas: an area (shown by drawing of rightwardly-ascending oblique lines) in which a fuel-air mixture is supplied only through the intake valve bore $6_1$ with one intake valve $V_{I2}$ substantially inoperative, thereby producing a swirl in the combustion chamber 5; and an area (shown by drawing of leftwardly-ascending oblique lines) in which an air-assisting for a fuel jet from the fuel injection valve 65 is prohibited, may be established in the same area.

What is claimed is:

1. A fuel injection type internal combustion engine comprising
   a pair of intake ports provided in a cylinder head to connect a pair of intake valve bores facing a combustion chamber with a single intake inlet end,
   a fuel injection valve disposed in an orientation from the intake inlet end toward both the intake valve bores and including an assist-air supply means for finely atomizing a fuel, and means for substantially stopping the intake through one of the intake ports in accordance with the operation condition of the engine, wherein
   said engine further includes a control means connected to said assist-air supply means for controlling said assist-air supply means to stop the supply of assist air from said assist-air supply means in at least a portion of an operational region in which the intake through one of the intake ports is substantially stopped.

2. A fuel injection type internal combustion engine according to claim 1, wherein in said operational region in which the intake through said one of the intake ports is stopped is at least one of either a number of revolutions of the engine or an engine load is equal to or less than a predetermined value.

3. A fuel injection type internal combustion engine according to claim 1, wherein said control means is arranged to stop the supply of the assist air from said assist-air supply means either when the number of revolutions of the engine is equal to or less than a predetermined value, or when the number of revolutions of the engine and the engine load are equal to or less than predetermined values, respectively.

4. A fuel injection type internal combustion engine according to claim 1, further including a valve operating system which is connected to a pair of intake valves capable of individually opening and closing the pair of intake valve bores and is arranged to permit one of said intake valves to be brought into a substantially inoperative state.

5. In a fuel injection type internal combustion engine having a pair of intake ports provided in a cylinder head to connect a pair of intake valve bores facing a combustion chamber with a single intake inlet opened end, a fuel injection valve disposed in an orientation facing from the intake inlet end toward both the intake valve bores and including an assist-air supply means for finely atomizing a fuel, and means for substantially stopping the intake through one of the intake ports in accordance with the operation condition of the engine, an improvement comprising,
   a control means connected to said assist-air supply means for controlling said assist-air supply means to stop the supply of assist air from said assist-air supply means in at least a portion of an operational region in which the intake through one of the intake ports is substantially stopped.

* * * * *